Sept. 10, 1940.  K. G. HEPLER  2,214,583
METHOD OF MAKING ELECTRIC HEATING UNITS AND RESULTANT PRODUCT
Filed April 15, 1938  2 Sheets-Sheet 1
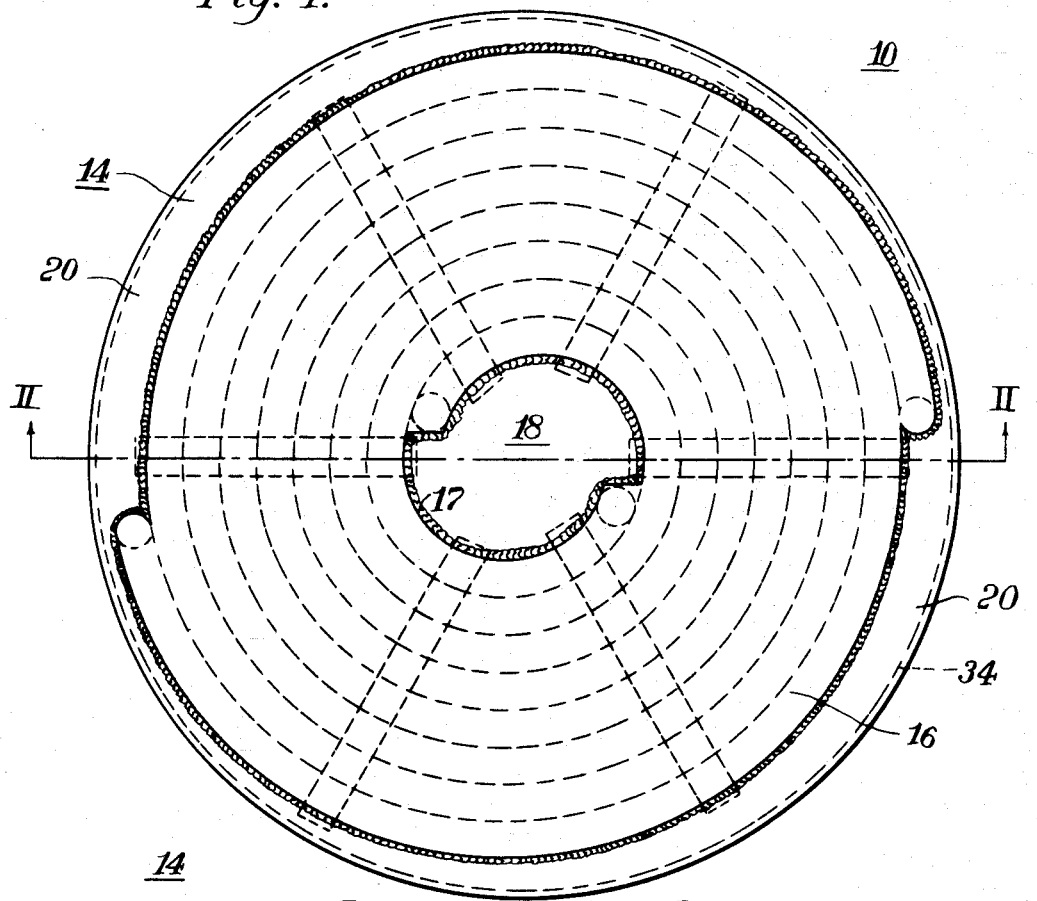
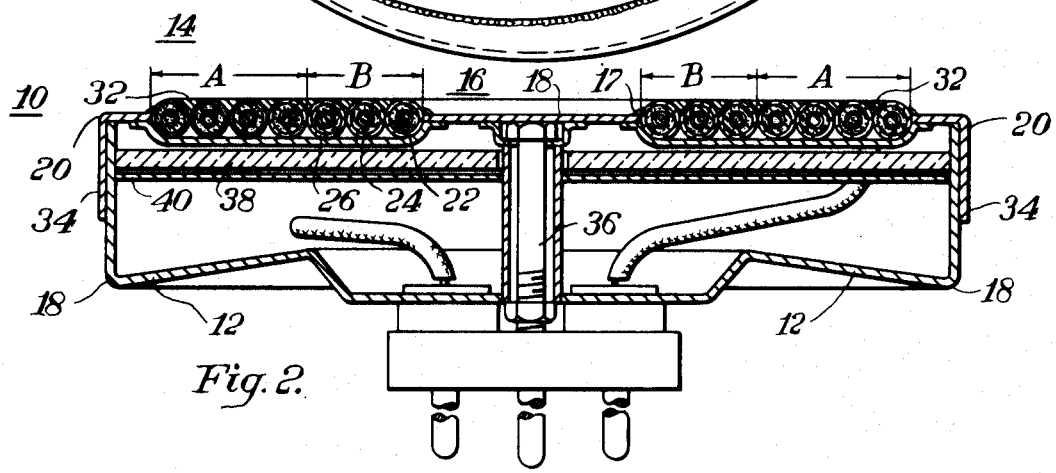
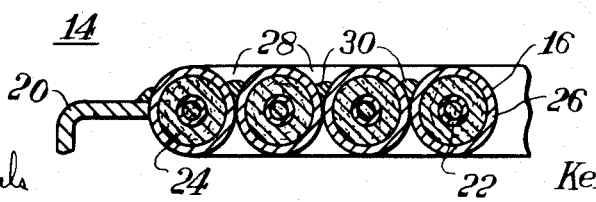
WITNESSES:
Edward Michaels
New C. Groome
INVENTOR
Kenneth G. Hepler.
BY
W R Coley
ATTORNEY Sept. 10, 1940.  K. G. HEPLER  2,214,583

METHOD OF MAKING ELECTRIC HEATING UNITS AND RESULTANT PRODUCT

Filed April 15, 1938   2 Sheets-Sheet 2

WITNESSES:
Edward Michaels
Chw. C. Groome

INVENTOR
Kenneth G. Hepler.
BY
WRColey
ATTORNEY

Patented Sept. 10, 1940

2,214,583

UNITED STATES PATENT OFFICE 2,214,583

METHOD OF MAKING ELECTRIC HEATING UNITS AND RESULTANT PRODUCTS

Kenneth G. Hepler, Youngstown, Ohio, assignor to Westinghouse Electric & Manufacturing Company, East Pittsburgh, Pa., a corporation of Pennsylvania Application April 15, 1938, Serial No. 202,234

13 Claims. (Cl. 219—37)

My invention relates to electric heating units, and more particularly, to range surface units or cooking plates and the method of making the same.

Surface units for electric ranges and the like have previously been constructed which comprise concentrically wound tubular heating bodies positioned in close relation to each other and attached together so as to form an integral unit. However, with this type of heating unit, the top surface thereof will have a plurality of narrow grooves therein which result in air pockets located between the unit and vessels positioned thereon. It is, therefore, an object of my invention to provide an electric heating unit which will have a flat cooking surface to provide for good contact with a vessel positioned thereon.

A further object of my invention is to provide a method of producing a flat surfaced heating unit from a coiled heating body.

A further object of my invention is to provide a method of producing an integral heating unit from a spirally wound elongated enclosed heating body by filling the grooves positioned between the convolutions of the heating unit, to provide material for the cooking surface thereof, and to increase the heat capacity of the unit.

A further object of my invention is to provide annular heating units which may be readily positioned within any suitable supporting structure.

Other objects of my invention will either be pointed out specifically in the course of the following description of a device embodying my invention, or will be apparent from such description.

In the accompanying drawings:

Figure 1 is a top plan view of a device embodying my invention;

Fig. 2 is a sectional view taken along the line II—II of Fig. 1;

Figs. 3, 4 and 5 are fragmentary enlarged views similar to Fig. 2, showing the device in its various stages of manufacture;

Figure 4:
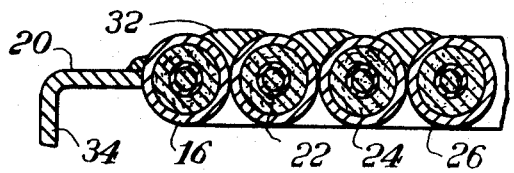
Figure 5:
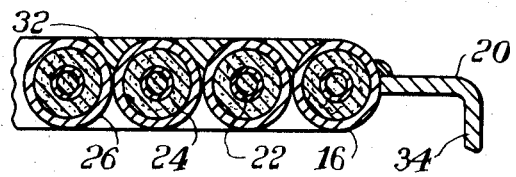

Referring to the accompanying drawings, I show an electric heating unit or cooking plate 10 comprising a supporting structure 12, a heating plate 14 which includes an enclosed heating element 16, a centrally disposed disc or plate 18 and a peripheral supporting ring 20.

The heating body 16 includes, in this instance, a resistance coil 22, and suitable insulating material 24 positioned around coil 22 within a sheath or casing 26. The heating plate 14 is formed by spirally winding the elongated enclosed heating body 16 about a common axis in such a manner that each whorl substantially contacts the adjacent whorls; in other words, the whorls are wound in a contiguous fashion. As the heating body is spirally wound, the adjacent convolutions or whorls thereof form substantially a V-shaped groove 28 therebetween, as shown in Fig. 3. However, it is to be understood that the shape of groove 28 is immaterial and will depend upon the shape of the elongated heating bodies 16.

If desired, the adjacent convolutions of the heating body may be supported and welded together such as by spot-welding, substantially as shown at 30 in Fig. 3, to unite the heating body into an integral unit. The substantially V-shaped grooves 28 will then be formed between the adjacent convolutions of the unit. These grooves 28 are then filled with a suitable metallic weld material or any other suitable heat-conducting material which will preferably fuse with the sheath or casing 26 of the heating body 16, in accordance with any well-known welding process, such as that employing carbon or metallic electrodes for depositing the weld material. The material 32 is positioned within the grooves 28 and should be extended above the top surface of the heating body 16 for a purpose hereinafter described. The weld material 32 will then be in intimate contact with at least two adjacent convolutions or whorls of the heating body, and therefore, will readily conduct the heat from the heating body to the cooking surface without any loss of efficiency other than that of the metal itself. In addition, the weld material will increase the heat capacity of the unit and will ensure an even distribution thereof.

The preferred method of forming the heating unit 10 comprises winding the heating body 16, which in this instance, includes at least two independent side-by-side tubular elements. The tubular elements contact each other as they are wound about the common axis substantially as hereinabove described. Accordingly, the substantially V-shaped grooves 28 will be formed between the elements and the heating body. Such grooves 28 are then filled with the weld material 32, substantially as hereinabove described.

The weld material 32 positioned within the grooves 28, which extends above the surface of the heating bodies 16, is then ground or polished to a predetermined configuration. However, it is to be understood that it is preferred to have the top surface of the heating unit substantially flat. The weld material 32 may be ground off to such a point that the top surfaces of the heating body 16 are exposed, or if desired, the weld material 32 may be left over the heating body 16 so that no part thereof will be exposed to the top surface.

It is to be understood that the top surface of the heating unit may, by building up the weld material on any portion thereof, be of any desired configuration, such as concave or convex, alternatively to the preferred flat surface.

As the heating bodies 16 are wound about a common axis, an irregularly shaped central gap or aperture 17 is left substantially in the center. A corresponding irregularly shaped disc 18 is then positioned within the aperture 17 so as to completely fill it. The disc 18 is then rigidly attached to the heating body 16, preferably by welding thereto. A similarly stamped sheet metal ring 20 is preferably rigidly attached to the outer edge of the heating body 16, preferably by welding thereto, as shown in Figs. 2 to 5 inclusive. However, it is to be understood that ring 20 need not be attached to the heating body 16. The ring 20 has a depending portion 34 by means of which the heating plate 14, which includes the ring 20, heating body 16 and disc 18, may be rigidly attached to the suitable supporting structure 12.

The depending portion 34 of the ring 20 may be rigidly attached to the casing 12 in any manner desired. However, it is preferred that the heating plate 14 be rigidly attached to the casing 12 by means of the bolt 36 substantially as shown in Fig. 2. As the heating plate 14 is rigidly attached to the casing 12, a certain amount of space is provided between the heating plate 14 and the casing 12. If it be desired, a ceramic insulating material 38 and a suitable reflector 40 may be positioned therein.

Figure 6:
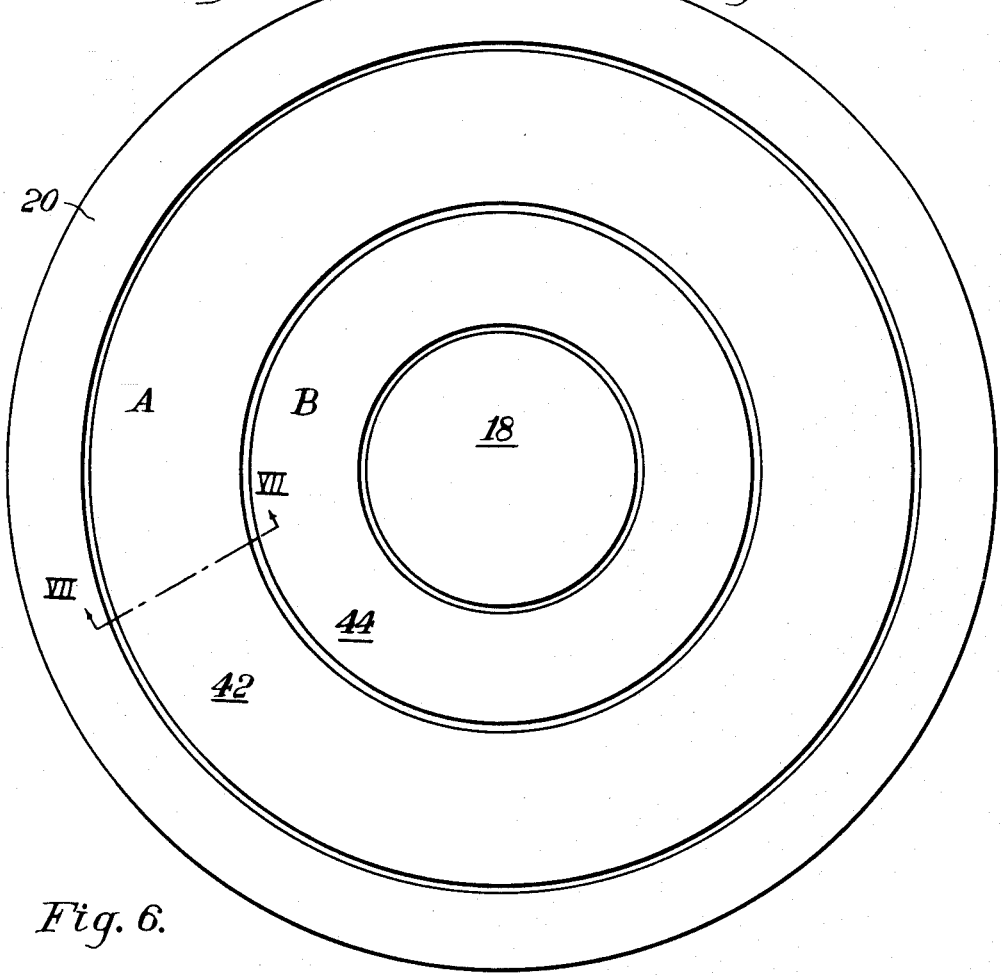
Fig. 6 is a top plan view of a modified form of the device embodying my invention.
Figure 7:
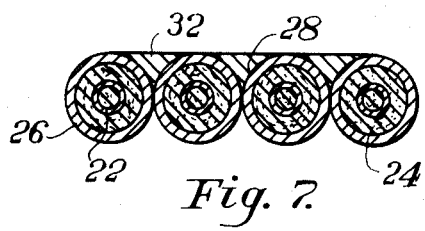
Fig. 7 is a sectional view of element A only taken along the line VII—VII of Fig. 6.

As a modification, the heating body 16 may be wound about a common axis to form a plurality of separate annular heating units 42 and 44. These annular heating members 42 and 44, as represented by A and B in Figs. 1 and 2, may be formed in different sizes as integral members substantially as shown in Figs. 6 and 7. These annular heating units 42 and 44 may have the grooves 28 filled with the weld material 32 and the surface thereof polished as hereinabove described substantially as shown in Fig. 7. These annular heating units A and B or 42 and 44 being separate integral structures may be removably positioned within the heating unit in any desirable manner. The weld material 32, which preferably fuses with the casings 26 of the heating body 16, substantially fills the grooves 28 formed between the convolutions thereof rigidly attaching such convolutions together, and producing a substantially flat heating surfaced annular heating structure, as hereinabove described.

Various further modifications may be made in the device embodying my invention without departing from the spirit and scope thereof, and I desire, therefore, that only such limitations shall be placed thereon as are imposed by the prior art and the appended claims.

I claim as my invention:

1. The method of making an electric heating unit which includes the steps of tightly spirally-winding a sheathed heating body to form an upper groove therebetween, and securing the adjacent spaced convolutions thereof together including the depositing of weld material to substantially fill only said upper groove and to fuse with the adjacent surfaces of the heating body, to form an integral member of relatively small mass adapted to quick heating.

2. The method of making an electric heating unit which includes the steps of tightly spirally-winding a sheathed heating body to form an upper groove therebetween, securing the adjacent spaced convolutions thereof together including the depositing of weld material to substantially fill only said upper groove and to fuse with the adjacent surfaces of the heating body, to form an integral member, and grinding the top surface of the heating unit to produce a predetermined configuration thereof.

3. The method of making an electric heating unit which includes the steps of tightly spirally-winding a sheathed heating body, comprising two side-by-side tubular elements, to form upper grooves therebetween, and securing the adjacent convolutions thereof together including the depositing of weld material, to substantially fill only said upper grooves and to fuse with adjacent surfaces of the tubular elements to form an integral member of relatively small mass adapted to quick-heating.

4. The method of making an electric heating unit which includes the steps of tightly spirally-winding a sheathed heating body, comprising two side-by-side tubular elements to form upper grooves therebetween, securing the adjacent convolutions thereof together including the depositing of weld material to substantially fill only said upper grooves and to fuse with adjacent surfaces of the tubular elements to form an integral member, and grinding the top surface of the heating unit to produce a predetermined configuration thereof.

5. The method of making an electric heating unit which includes the steps of tightly spirally winding a sheathed heating body to form a groove therebetween, welding the adjacent surfaces of the heating body together so as to substantially fill the groove and to form an integral member of relatively small mass adapted to quick-heating, securing a metal disc to the central portion of the unit, and securing a metal ring to the outside of the unit for supporting the unit.

6. The method of making an electric heating unit which includes the steps of tightly spirally winding a sheathed heating body to form a groove therebetween, welding the adjacent surfaces of the heating body so as to substantially fill the groove and to form an integral member, grinding the top surface of the heating unit to produce a predetermined configuration thereof, securing a metal disc to the central portion of the unit, and securing a metal ring to the outside of the unit for supporting the unit.

7. The method of making an electric heating unit which includes the steps of tightly spirally winding a sheathed heating body, comprising two side-by-side tubular elements, to form grooves therebetween, welding the adjacent surfaces of the heating elements so as to substantially fill the grooves and to form an integral member capable of operation at elevated temperatures, disposing a thin metal disc to constitute the central portion of the unit, and securing a metal ring to the outside of the unit for supporting the unit, the unit being subject to warpage to a relatively small degree by reason of the central portion having materially less mass than the outer portion.

8. The method of making an electric heating unit which includes the steps of tightly spirally winding a sheathed heating body, comprising two side-by-side tubular elements, to form grooves therebetween, welding the adjacent surfaces of the heating elements so as to substantially fill the grooves and to form an integral member, grinding the top surface of the heating unit to produce a predetermined configuration thereof, securing a metal disc to the central portion of the unit, and securing a metal ring to the outside of the unit for supporting the unit.

9. A heating unit comprising, in combination, a tightly spirally-wound elongated enclosed heating body, the convolutions thereof forming an upper groove therebetween, a thin metal disc disposed to constitute the central portion of the unit, and means including a body of weld material substantially filling only said upper groove and rigidly attaching the convolutions together to form a small-mass, quick-heating unit capable of operation at elevated temperatures, the unit being subject to warpage to a relatively small degree by reason of the central portion having materially less mass than the outer portion.

10. A heating unit comprising, in combination, a tightly spirally-wound elongated heating body, said body including two side-by-side tubular elements, the convolutions thereof forming upper grooves therebetween, and means including a body of weld material to substantially fill only said upper grooves to fuse with the adjacent surfaces of the heating body and rigidly attaching the convolutions thereof together, said deposit and elements forming a substantially flat heating surface and said unit having a small mass adapted to quick-heating.

11. A heating unit comprising, in combination, a tightly spirally-wound elongated enclosed heating body, the convolutions thereof forming an upwardly facing space therebetween, a thin metal disc disposed to constitute the central portion of the unit, and means including a body of weld material to substantially fill only the space and rigidly attach the convolutions together to form a small-mass, quick-heating unit capable of operation at elevated temperatures, the unit being subject to warpage to a relatively small degree by reason of the central portion having materially less mass than the outer portion.

12. A heating unit comprising, in combination, a tightly spirally-wound elongated heating body, said body including two side-by-side tubular elements, the convolutions thereof forming upper grooves therebetween and an aperture therewithin, and means including a body of weld material to substantially fill only said upper grooves to fuse with the adjacent surfaces of the heating body and rigidly attach the convolutions thereof together, a thin metallic disc rigidly disposed to constitute the central portion of the heating body for closing said aperture and uniting the inner convolutions of the heating body, to form a small-mass, quick-heating unit capable of operation at elevated temperatures, the unit being subject to warpage to a relatively small degree by reason of the central portion having materially less mass than the outer portion.

13. The method of making an electric heating unit which includes the steps of tightly spirally winding a sheathed heating body to form an upwardly facing space therebetween, disposing a thin metal disc to constitute the central portion of the unit, and securing the adjacent convolutions together by depositing weld material to substantially fill only said space to form a unit of relatively small mass adapted to quick-heating and operation at elevated temperatures, the unit being subject to warpage to a relatively small degree by reason of the central portion having materially less mass than the outer portion.

KENNETH G. HEPLER.